US009776601B2

(12) United States Patent
Bercovici

(10) Patent No.: US 9,776,601 B2
(45) Date of Patent: Oct. 3, 2017

(54) CHARGING STATION AND METHOD FOR OPERATING SAME

(75) Inventor: Adrian Bercovici, Bonn (DE)

(73) Assignee: Deutsche Post AG, Bonn (DE)

(*) Notice: Subject to any disclaimer, the term of this patent is extended or adjusted under 35 U.S.C. 154(b) by 1800 days.

(21) Appl. No.: 13/142,809

(22) PCT Filed: Dec. 17, 2009

(86) PCT No.: PCT/EP2009/009054
§ 371 (c)(1),
(2), (4) Date: Jun. 29, 2011

(87) PCT Pub. No.: WO2010/075974
PCT Pub. Date: Jul. 8, 2010

(65) Prior Publication Data
US 2011/0267003 A1    Nov. 3, 2011

(30) Foreign Application Priority Data

Dec. 31, 2008  (DE) .................. 10 2008 063 436

(51) Int. Cl.
*H02J 7/00* (2006.01)
*B60S 5/06* (2006.01)

(52) U.S. Cl.
CPC .............. *B60S 5/06* (2013.01); *H02J 7/0004* (2013.01); *Y02T 90/124* (2013.01)

(58) Field of Classification Search
USPC ....................................................... 320/104
See application file for complete search history.

(56) References Cited

U.S. PATENT DOCUMENTS

| 6,456,037 | B1 | 9/2002 | Jakl et al. |
| 2005/0048359 | A1 | 3/2005 | Yamada et al. |
| 2007/0113921 | A1* | 5/2007 | Capizzo ......................... 141/231 |
| 2007/0244471 | A1* | 10/2007 | Malackowski ............... 320/107 |
| 2009/0170569 | A1* | 7/2009 | Anzai et al. .................. 455/573 |
| 2009/0198372 | A1* | 8/2009 | Hammerslag ................. 700/226 |
| 2010/0145717 | A1 | 6/2010 | Hoeltzel |
| 2011/0267003 | A1 | 11/2011 | Bercovici |

FOREIGN PATENT DOCUMENTS

| JP | H10509579 A | 9/1998 |
| JP | 2000164185 A | 6/2000 |
| JP | 2001057711 A | 3/2001 |
| JP | 2007252117 A | 9/2007 |
| JP | 2008042985 A | 2/2008 |

OTHER PUBLICATIONS

International Search Report, date mailed Oct. 4, 2010, English.
International Preliminary Report on Patentability, dated Mar. 23, 2011, German.
International Preliminary Report on Patentability, dated Mar. 23, 2011, English Translation.

* cited by examiner

Primary Examiner — Robert Grant
(74) Attorney, Agent, or Firm — International IP Law Group, PLLC

(57) ABSTRACT

There is provided a loading station. An exemplary loading station comprises a storage medium for use as a source of energy for vehicles. The exemplary loading station also comprises a device that controls a loading and/or unloading process of the storage medium and for identifying the storage medium. A transponder for wireless data transmission is connected to the storage medium. The loading station further comprises a detection device for the transponder.

1 Claim, 1 Drawing Sheet

CHARGING STATION AND METHOD FOR OPERATING SAME

CROSS-REFERENCE TO RELATED APPLICATIONS

Pursuant to 35 U.S.C. §371, this application is the U.S. National Stage Application of International Patent Application No. PCT/EP2009/009054, filed on Dec. 17, 2009, the contents of which are incorporated by reference as if set forth in their entirety herein, which claims priority to European (DE) Patent Application No. 10 2008 063 436.0, filed Dec. 31, 2008, the contents of which are incorporated by reference as if set forth in their entirety herein.

BACKGROUND

Numerous sources of energy are known for supplying power to vehicles.

An automatic storage-monitoring and battery-exchange system for electrically powered transport vehicles is known from European patent application EP 0 476 405 A1.

The loading station disclosed there comprises a battery-exchange station with loading devices for multiple batteries. Here, each of the batteries has an identification code that identifies it. Moreover, a reading device for identifying the batteries is located on the transport vehicle as well as in the exchange station.

SUMMARY

The subject innovation relates to a loading station as well as to a method for its operation.

The subject innovation provides a storage medium that makes it possible to supply a plurality of vehicles as flexibly and reliably as possible with storage media that have a desired charge level for desired operating states of vehicles.

In particular, according to the subject innovation, it is desirable to quickly and reliably provide vehicles with storage media that are as fully charged as possible.

BRIEF DESCRIPTION OF THE DRAWINGS

The above discussed embodiments are only examples. Skilled people may consider modifications of said embodiments within the scope of the subject innovation. More details of the subject innovation are shown in the following figures and the detailed description of exemplary embodiments.

DETAILED DESCRIPTION OF SPECIFIC EMBODIMENTS

Figure 1:
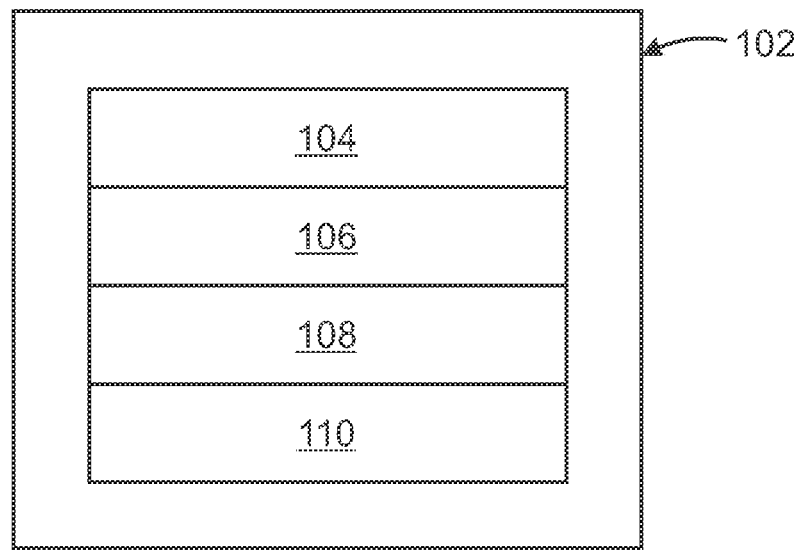
FIG. 1 is a block diagram of a loading station according to the subject innovation.

FIG. 1 is a block diagram 100 of a loading station 102 according to the subject innovation. The loading station 102 includes a storage medium 104, a control device 106, a transponder 108 and a detection device 110.

Figure 2:
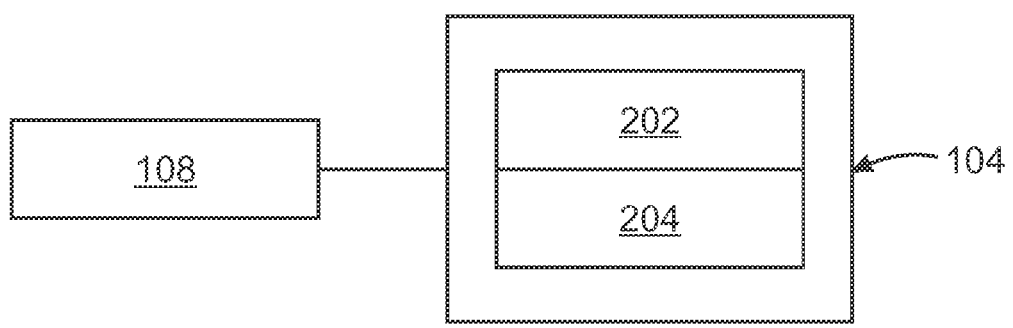
FIG. 2 is a block diagram of a storage medium according to the subject innovation.

FIG. 2 is a block diagram 200 of a storage medium 104 according to the subject innovation. The storage medium 104 includes an authorization unit 202 and a data memory 204. The storage medium 104 is connected to a transponder 108.

The subject innovation comprises a loading station with means for controlling a loading and/or unloading process of a storage medium.

According to the subject innovation, the loading station is configured in such a way that it has a means for identifying the storage medium.

A refinement of the subject innovation provides that the loading station is configured in such a way that it has a means for reading a data memory of the storage medium.

Another embodiment of the subject innovation provides that the loading station has a device for detecting a transponder.

Another embodiment of the subject innovation provides that the loading station has a means for checking the charge status of the storage medium.

Another embodiment of the subject innovation provides that the loading station has a data memory for storing information about the charge status of the storage medium.

The subject innovation also relates to a storage medium, especially for use as a source of energy for vehicles, in that the storage medium has a data memory that stores information about the charge status of the storage medium.

A refinement of the storage medium is characterized in that the data memory can store information about at least one place of use.

One embodiment of the storage medium provides that it is connected to a means for wireless data transmission.

A refinement of the storage medium is characterized in that the means for wireless data transmission is a transponder.

One embodiment of the storage medium comprises that it has an authorization device, the authorization device being configured in such a way that information can only be transmitted to the data memory via an authorized data transmission device.

Another embodiment of the subject innovation provides that the storage medium contains a SIM card.

An example of the subject innovation comprises a loading station with means for controlling loading and/or unloading processes as well as for controlling the exchange of at least a first storage medium for a second storage medium. According to the subject innovation, it is provided that the loading station has a means for associating the first storage medium with a vehicle and/or with the owner of the vehicle.

A refinement of the subject innovation is characterized in that the means for associating the first storage medium has a means for identifying the vehicle and/or the owner of the vehicle.

Another example of the subject innovation provides that the means for identifying the vehicle and/or the owner of the vehicle has a unit for detecting the license plate of the vehicle.

Another embodiment of the loading station according to the subject innovation is characterized in that it has a card reader, especially for a chip card.

A refinement of the loading station according to the subject innovation provides that it has a device for detecting a transponder.

Another embodiment of the subject innovation provides that it has a means for removing the first storage medium from the vehicle.

A refinement of the subject innovation provides that the loading station has a means for loading the vehicle with the additional storage means.

Another embodiment of the subject innovation provides that the loading station has a means for checking the charge status of the first storage medium.

A refinement of the subject innovation provides that the loading station has a data memory for storing information about the charge status of storage media.

The subject innovation also proposes a method for operating a vehicle with several storage media.

This method is characterized in that loading and/or unloading at least one of the storage media is carried out in such a way that the charge status of this storage medium is below a predefinable lower target value.

The term "storage medium" is to be understood in the broad sense of the word. In particular, it encompasses a source of electrical energy, for example, a battery. However, it is also possible that these can be other sources of energy such as, for example, fuel for vehicles.

The term "unloading" is also to be understood in a broad sense. It encompasses the unloading of a battery that serves as a storage medium as well as the removal of a source of energy from a reservoir, for example, from a tank.

One embodiment of the subject innovation is characterized in that the lower target value is selected in such a way that the storage medium is charged in a charging device situated outside of the vehicle.

Another embodiment of the subject innovation is characterized in that loading and/or unloading at least one additional storage medium is carried out in such a way that the additional storage medium has the highest possible charge status.

Another embodiment of the subject innovation provides for carrying out the method in such a way that it comprises the following steps:
entering delivery addresses for the loaded goods;
calculating the travel route;
acquiring additional information pertaining to the specifics of the calculated travel route;
calculating power requirements of the hybrid drive;
determining a utilization plan for the hybrid drive along the calculated travel route in order to reduce the energy consumption and/or the emissions of the logistics vehicle.

In one embodiment of the method according to the subject innovation, the delivery addresses are read in automatically. In a refinement of the subject innovation, this can be done contact-free. In this manner, the delivery is handled especially efficiently.

Advantageously, the circumstances of the travel route are taken into account for the determination of the utilization plan of the hybrid drive. This includes, for example, making a distinction as to whether the vehicle is traveling in a residential area or on a country road. Experience has shown that a great deal of electric energy is used within a residential area.

Preferably, the charge status of the battery is controlled as a function of the anticipated stops of the logistics vehicle.

In an advantageous embodiment of the subject innovation, the travel route is recalculated after each stop of the logistics vehicle. This is dynamic route planning, which constantly incorporates the current circumstances into the new calculation. In this manner, it is ensured that information about the traffic situation that arrives after the calculation of the first travel route is taken into account for the further route planning. This measure also saves time, lowers the energy consumption of the logistics vehicle and reduces its emissions.

Advantageously, in a refinement of the subject innovation, a message is sent to a recipient after each change to the travel route. The recipient can be the recipient of a shipment and/or a dispatch center of the logistics service provider. In a variant of this embodiment of the subject innovation, however, a message is only sent to a recipient if the change in the travel route results in a change in the original travel time.

Another object of the subject innovation is to propose a logistics vehicle that is equipped in such a way that it allows the execution of the method according to the subject innovation.

This object is achieved by a logistics vehicle according to claim 1.

According to the subject innovation, a vehicle, especially a logistics vehicle, is proposed that has a hybrid drive and a detection device. The detection device is configured in such a way that it autonomously acquires delivery addresses for the loaded goods. Moreover, a telematics system is provided that is connected to the hybrid drive, to the detection device, and to navigation satellites in order to exchange information.

In one embodiment of the subject innovation, the telematics system is configured in such a way that it reads out the delivery addresses from the detection device and calculates a travel route.

The detection device can advantageously have RFID reading devices.

The invention claimed is:

1. A loading station, comprising: a storage medium for use as a source of energy for vehicles being connected to a transponder for wireless data transmission and comprising a data memory that stores information about the charge status of the storage medium and an authorization unit configured so that only an authorized data transmission unit can transmit information to the data memory: a device that controls a loading and/or unloading process of the storage medium and for identifying the storage medium: and a detection device for the transponder located in a loading station; wherein the storage medium contains a SIM card.

* * * * *